Jan. 9, 1934.  R. RUEMELIN  1,942,453
SUPPORT FOR FLEXIBLE HOSE
Filed Jan. 31, 1929
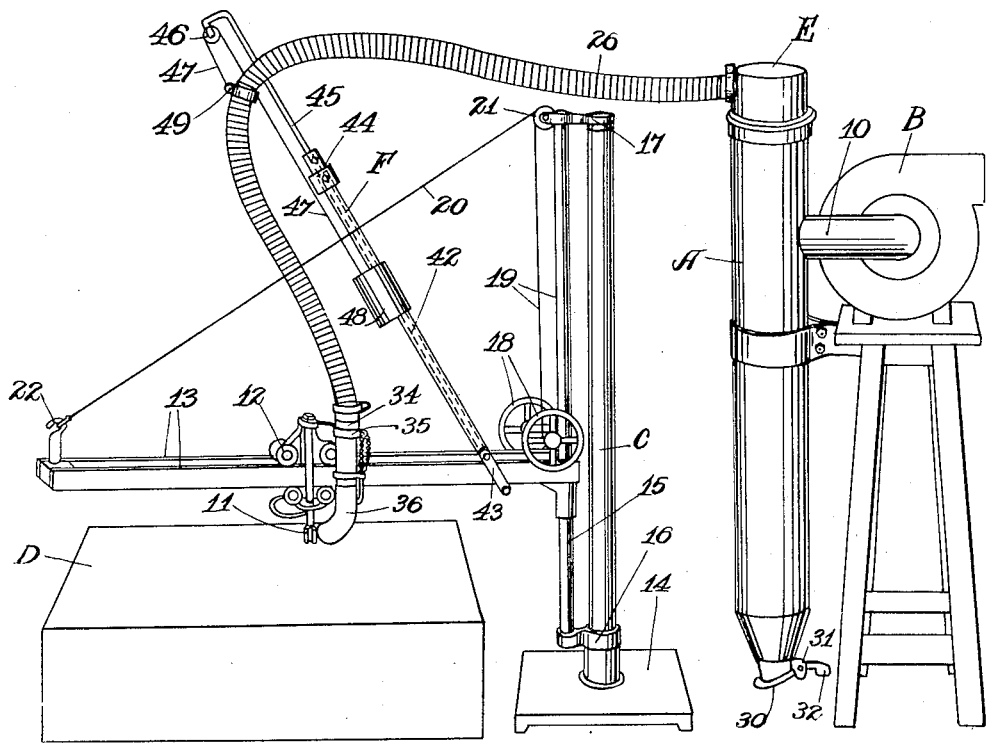
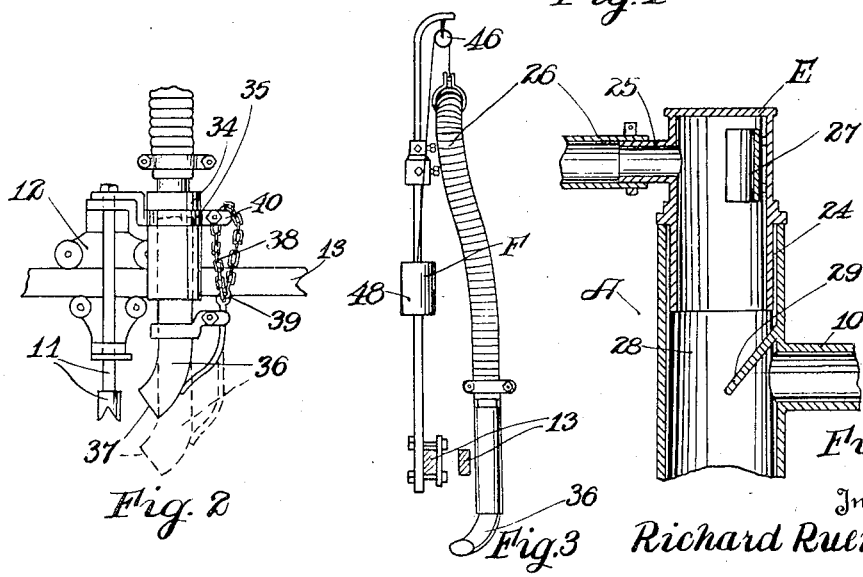
Inventor
Richard Ruemelin
By [signature]
Attorney Patented Jan. 9, 1934

1,942,453

UNITED STATES PATENT OFFICE 1,942,453

SUPPORT FOR FLEXIBLE HOSE

Richard Ruemelin, Minneapolis, Minn.

Application January 31, 1929. Serial No. 336,580

4 Claims. (Cl 248—28)

My invention relates to an adjustable dust and chip collector for stone cutting tools, having means for collecting the dust and chips during the operation of the cutting or carving tool in stone carving, thus keeping the surface of the stone being carved clean about the cuttting tool, and permitting the operator to more readily and efficiently operate the cutting tool.

It is a feature of my invention to provide a flexible pipe extending from the stone trap to an adjustable nozzle which is positioned near the cutting tool.

My invention includes an adjustable nozzle adapted to be adjusted to different positions for various lengths of cutting tools.

It is also a feature of my invention to provide a means of supporting the intermediate portion of the flexible pipe or hose between the stone trap and the collector nozzle in a manner so as to balance the weight of the same and also to hold the flexible pipe, which may also be termed a snake pipe, adjustable and balanced so as to take the weight of the snake pipe off of the carriage which supports the cutting tool as much as possible. This I accomplish by a counter-balancing member which overcomes the weight of the snake pipe to a large extent and permits the snake pipe to automatically adjust itself to the proper position during the operation of the cutting tool.

My invention includes a stone trap for catching the large particles of stone which are cut by the cutting tool, having an adjustable swiveled head for connection with the snake pipe and also a guard over the suction opening leading to the suction fan so as to protect the fan against injury by preventing large particles or chips of stones from entering into the fan.

A further object of my adjustable dust and chip collector for stone cutting tools resides in providing a protector plate within the stone trap directly opposite the intake into the head of the stone trap by a resilient shield such as rubber or other suitable material so that when the chips and stones strike against this shield they will not injure the inside of the swiveled head. Further, the stone trap is provided with an automatic stone discharge valve in the bottom of the same so that when the stone trap has collected a certain amount or weight of stones, they will automatically be discharged out of the bottom of the same and the valve will automatically close, being aided by the suction of the fan which collects the chips and stones from and about the cutting tool.

It is also a feature of my invention to provide a suitable adjustable standard for supporting the balancing and supporting means for the snake pipe and for the rails for the carriage which supports the cutting tool, suitable means being provided to permit the carriage to swivel about this standard and adjustable means for raising and lowering the tool carrying rails to the desired position.

All of these features, together with other objects and details which will be more fully hereinafter pointed out, form the essentials of my adjustable dust and chip collector for stone cutting tools.

In the drawing forming part of this specification:

Figure 1 illustrates my adjustable dust and chip collector for stone cutting tools as it would appear in operation.

Figure 2 is an enlarged detail of a portion of the same, showing the collector nozzle and cutting tool.

Figure 3 is another detail showing the collector nozzle and a portion of the snake pipe, together with the adjustable balancing bracket for the snake pipe.

Figure 4 is an enlarged detail of the swiveling head which is illustrated in section in position in the top of the stone trap, only a portion of which is illustrated.

In the drawing I illustrate my adjustable dust and chip collector for stone cutting tools which includes the stone trap A connected by the pipe 10 to the blower B which forms the desired suction within the stone trap A so as to create a vacuum and pick up dust, chips and small particles of stone and carry them away from the cutting tool 11 which is supported by the carriage 12 which runs on the horizontal rails 13.

I provide a standard C supported from the base 14 which pivotally supports a guide rod 15 in the brackets 16 and 17. These brackets support the ends of the guide rod 15 so that the rod 15 may be rotated about the main standard C projecting upward from the base 14.

The guide rod 15 is adapted to slideably support the horizontally extending guide rails 13 and by means of suitable operating handles 18 which are adapted to operate the adjusting cable 19, the guide rails 13 may be raised and lowered on the guide rod 15. I provide a suitable guy cable 20 which is an extension of the cable 19 over the pulley 21 and which is connected by the hook 22 to the outer free end of the horizontal guide tracks 13. This guy cable 20 supports the outer end of the guide tracks 13 for the carriage 12. When the handles 18 are operated to raise or lower the horizontal guides 13 the cable 19 together with the cable wire 20 are lengthened or shortened to keep the guide tracks 13 extending horizontal in relation to the standard C. The whole supporting means for the guide tracks 13 are pivotally supported by the brackets 16 and 17 to the standard C. This permits the carriage 12 to be circled about the standard and this movement together with the sliding of the carriage along the tracks 13 permits the cutting tool 11 to be operated in a manner to cut a stone such as D to carve the same in the operation of the tool 11.

I provide a swiveling head E which forms the top of the stone trap A to close the same and which is adapted to swivel on the sleeve portion 24 which projects into the upper end of the stone trap A. Projecting from one side of the head E I provide an intake pipe 25 which is adapted to receive one end of the snake or flexible collector pipe 26. On the side wall directly opposite the intake pipe 25 I provide a rubber plate member 27 or a soft flexible plate member of any suitable nature which is adapted to protect the side wall of the head E so that any stones or chips flying in through the intake pipe 25 and striking the soft plate 27 are prevented from wearing or denting the wall of the swivel head E. This provides a means of lengthening the life of the swivel head in operation. The guard or protector plate 27 may be replaced from time to time as it is worn out in operation.

Within the chamber 28 of the stone trap A I provide a guard 29 projecting above the outlet pipe 10 which leads to the blower B. This guard 29 protects the passageway in the pipe 10 so that no stones or chips will be thrown into the same by the blower B but will rather cause the stones to drop into the bottom of the chamber 28 in the stone trap A and when a certain number or weight of stones is collected within the trap A, the automatic discharge valve 30 which is pivotally held at 31 and counter-balanced by the weight 32, will permit the stones to be automatically discharged from the stone trap.

The snake pipe or flexible collector 26 is adapted to extend and be connected to the sleeve 34 which is supported by the bracket member 35 to the carriage 12. This sleeve 34 adjustably carries the nozzle 36 which has a lower curved end 37 extending toward the connecting tool 11 in a manner so that it can be placed closely to the tool so that when the tool is operated to cut the stone D, the nozzle 36 will operate to collect the dust, particles of stone, and stone chips, and draw them away from the tool to keep the surface of the stone D clean about the tool and thus permit the operator to more readily carve the stone.

The nozzle 36 is held adjustable in the sleeve 34 by the chain 38 which is formed with a hook 39 on one end and which is looped over the end 40 of the bracket 35. By changing the hook engagement 39 into different links in the chain 38 the nozzle 36 may be raised or lowered and easily adjusted into the desired position for different lengths of cutting tools.

It is important in the operation of the cutting tool 11 to permit the same to be freely and easily adjusted into the desired position in relation to the stone D and so that the tool 11 can be freely moved to carve the stone as desired. Thus it is very important that no excess weight be carried by the carriage 12. I have therefore found it necessary in providing a practical and satisfactory means of supporting the intermediate portion of the snake pipe 26 to provide the automatically adjustable bracket means F which is formed by the hollow member 42 clamped on one end at 43 to the track 13 and being provided with a bracket 44 on the upper end which is adapted to slidably support the rod 45 so that the rod 45 can telescope into the standard or supporting member 42 in adjusting the length of the rod 45. The bracket or clamp 44 holds the rod 45 in adjusted relationship with the support 42. The outer end of the rod 45 is adapted to support a pulley 46 over which a flexible cable 47 is adapted to run and by means of a weight 48 which is slidably supported on the rod 42 and which is connected to the cable 47 I provide means for balancing the intermediate portion of the snake pipe 26 by attaching the outer end of the cable 47 at 49 to the snake pipe 26.

Thus my adjustable dust and chip collector provides a means of collecting the dust and chips from the stone such as D close to the cutting tool 11 and without interfering with the free movement of the tool 11 owing to the balancing support for the snake pipe 26 and the general adjustable structure of the standard C which supports the rails 13.

In accordance with the patent statutes I have described the principles of operation of my adjustable dust and chip collector for stone cutting tools and while I have illustrated a particular formation and arrangement of the parts, I desire to have it understood that these are only illustrative of a means of carrying out the principles of my invention and that obvious changes may be made within the scope of the following claims without departing from the spirit of the invention.

I claim:

1. A support for flexible hose including, a vertical standard, a horizontal arm vertically adjustable along said standard, a hollow supporting member extending angularly from said arm, a rod in telescoping relationship with said supporting member, and means secured to the free end of the rod for supporting flexible hose.

2. A support for flexible hose including, a vertical standard, a member adjustable along said standard, a hollow supporting member secured angularly to said adjustable member and adjustable therewith, a rod adjustably secured in telescoping relationship to said hollow supporting member, and means on the free end of said rod for supporting a flexible hose.

3. A support for flexible hose including, a vertically extending standard, a member adjustable along said standard, an extendable supporting member secured angularly to said adjustable member, and means on said extendable supporting member for engagement with a flexible hose.

4. A support for flexible hose including, a standard, a member adjustable along said standard, means for moving said member along said standard, a hollow supporting member secured to said support and adjustable therewith, a rod in telescoping relationship with said hollow supporting member, and means secured to the free end of said rod for supporting a flexible hose.

RICHARD RUEMELIN.